(12) United States Patent
Revie et al.

(10) Patent No.: US 6,755,498 B2
(45) Date of Patent: Jun. 29, 2004

(54) ESTABLISHING A REFERENCE PRINTER STATE USING A RECURSIVE TONE SCALE MATCHING

(75) Inventors: Craig Revie, Buckinghamshire (GB); Kenneth Elsman, Arlington, MA (US); Dean Edis, Peterborough (GB); Peter Manwell, Oakington (GB)

(73) Assignee: Global Graphics Software Limited, Cambridge (GB)

( * ) Notice: Subject to any disclaimer, the term of this patent is extended or adjusted under 35 U.S.C. 154(b) by 19 days.

(21) Appl. No.: 10/108,753

(22) Filed: Mar. 27, 2002

(65) Prior Publication Data

US 2003/0025925 A1 Feb. 6, 2003

Related U.S. Application Data

(60) Provisional application No. 60/279,049, filed on Mar. 27, 2001.

(51) Int. Cl.[7] .............................. B41J 2/205; B41J 2/21
(52) U.S. Cl. .......................................... 347/15; 347/43
(58) Field of Search .................... 347/15, 45; 358/3.01, 358/3.06

(56) References Cited

U.S. PATENT DOCUMENTS

| | | | |
|---|---|---|---|
| 4,092,067 A | 5/1978 | Grossmann | 355/77 |
| 4,182,560 A | 1/1980 | Oguchi | 396/315 |
| 4,192,605 A | 3/1980 | Fergg | 355/38 |
| 4,468,123 A | 8/1984 | Miller | 356/404 |
| 4,873,546 A | 10/1989 | Zahn | 355/38 |
| 5,231,504 A | 7/1993 | Magee | 358/500 |
| 5,293,258 A | 3/1994 | Dattilo | 358/518 |
| 5,612,903 A | 3/1997 | Miller | 355/35 |
| 6,026,216 A | 2/2000 | Ohtsuka et al. | |
| 6,075,614 A | 6/2000 | Ohtsuka et al. | |
| 6,213,579 B1 * | 4/2001 | Cornell et al. | 347/14 |
| 6,354,688 B1 * | 3/2002 | Inoue et al. | 347/15 |
| 6,522,778 B1 | 2/2003 | Tamagawa | |

* cited by examiner

*Primary Examiner*—Thinh Nguyen
(74) *Attorney, Agent, or Firm*—Darby & Darby

(57) ABSTRACT

Method and system for determination of a reference printer state using recursive tone scale matching. The present invention determines the ink values for the primary colorants necessary to produce a desired reference printer state that includes a desired tone reproduction curve and a desired neutral response. The amount of ink for each colorant necessary to produce the desired printer response is initially estimated and then recursively adjusted. Upon each adjustment, a color print is produced with patches of the various combinations of colorants. The actual color of the printed color patches are then determined. If the actual colors match the desired print response, then the process ends and the reference printer state has been determined. If the printer response does not match the desired printer response, then the ink values for the colorants are adjusted and the processes it repeated.

11 Claims, 15 Drawing Sheets

Input Data

Table 40:

| C | Ma | Y | K |
|---|---|---|---|
| 0 | 0.2 | 0 | 0 |
| 5 | 2.7 | 2.3 | 0 |
| 10 | 4.1 | 3.8 | 0 |
| 15 | 6.9 | 6.6 | 0 |
| 20 | 10.2 | 8.9 | 0 |
| 30 | 16.3 | 13.4 | 0 |
| 40 | 26.6 | 18 | 0 |
| 50 | 38.5 | 25 | 0 |
| 60 | 54.1 | 36.6 | 0 |
| 70 | 71.4 | 54.9 | 0 |
| 80 | 84.4 | 76.1 | 0 |
| 90 | 94.8 | 93 | 0 |
| 95 | 97.6 | 96.6 | 0 |
| 100 | 100.2 | 100 | 0 |

Table 42:

| C | M | Y | K |
|---|---|---|---|
| 0 | 0 | 0 | 0 |
| 5 | 2.5 | 2.3 | 0 |
| 10 | 3.6 | 3.8 | 0 |
| 15 | 6.7 | 6.6 | 0 |
| 20 | 9.6 | 8.9 | 0 |
| 30 | 16 | 13.4 | 0 |
| 40 | 25.6 | 18 | 0 |
| 50 | 36.5 | 25 | 0 |
| 60 | 53.9 | 36.6 | 0 |
| 70 | 71.2 | 54.9 | 0 |
| 80 | 84.2 | 76.1 | 0 |
| 90 | 94.6 | 93 | 0 |
| 95 | 97.4 | 96.6 | 0 |
| 100 | 100 | 100 | 0 |

Table 44:

| C | M | Ya | K |
|---|---|---|---|
| 0 | 0 | 0.2 | 0 |
| 5 | 2.5 | 2.5 | 0 |
| 10 | 3.6 | 4.3 | 0 |
| 15 | 6.7 | 6.8 | 0 |
| 20 | 9.6 | 9.5 | 0 |
| 30 | 16 | 13.7 | 0 |
| 40 | 25.6 | 19 | 0 |
| 50 | 36.5 | 27 | 0 |
| 60 | 53.9 | 36.8 | 0 |
| 70 | 71.2 | 55.1 | 0 |
| 80 | 84.2 | 76.3 | 0 |
| 90 | 94.6 | 93.2 | 0 |
| 95 | 97.4 | 96.8 | 0 |
| 100 | 100 | 100.2 | 0 |

Figure 4A

Measurements

Table 46 (CMYaK):

| L* | a* | b* |
|---|---|---|
| 97.46 | 1.57 | -3.29 |
| 93.3 | 2.31 | -3.58 |
| 90.6 | 2.13 | -4.17 |
| 85.94 | 1.77 | -3.76 |
| 81.26 | 2.13 | -3.3 |
| 72.74 | 1.71 | -3.63 |
| 61.42 | 2.7 | -4.82 |
| 51.42 | 2.32 | -4.28 |
| 42.46 | -0.02 | -4.06 |
| 33.5 | -1.45 | -4.29 |
| 25.35 | -3.42 | -5.44 |
| 20.22 | -5.25 | -5.91 |
| 18.87 | -5.3 | -6.15 |
| 16.13 | -5.73 | -6.63 |

Table 48 (CMYK):

| L* | a* | b* |
|---|---|---|
| 97.51 | 1.24 | -3.19 |
| 93.48 | 1.94 | -3.29 |
| 91.18 | 0.93 | -3.33 |
| 86.21 | 1.26 | -3.69 |
| 81.7 | 1.06 | -2.52 |
| 72.95 | 1.52 | -3.62 |
| 61.8 | 2.12 | -4.58 |
| 52.08 | 0.55 | -3.53 |
| 42.45 | 0.26 | -4.29 |
| 33.35 | -1.44 | -3.9 |
| 25.49 | -3.1 | -4.8 |
| 20.09 | -5.03 | -5.77 |
| 18.57 | -4.77 | -6.09 |
| 16.27 | -5.52 | -6.47 |

Table 50 (CMaYK):

| L* | a* | b* |
|---|---|---|
| 97.57 | 1.11 | -2.55 |
| 93.43 | 2.05 | -3.59 |
| 91.19 | 0.7 | -2.56 |
| 86.43 | 1.11 | -3.25 |
| 81.65 | 1.03 | -2.46 |
| 72.91 | 1.18 | -2.33 |
| 61.86 | 1.48 | -2.86 |
| 52.05 | 0.03 | -0.91 |
| 42.39 | 0.13 | -3.95 |
| 33.57 | -1.43 | -4.29 |
| 25.45 | -3.4 | -5.09 |
| 20.31 | -5.17 | -5.73 |
| 18.59 | -4.82 | -5.94 |
| 16.22 | -5.15 | -6.51 |

Aim Values (54)

| L* | a* | b* |
|---|---|---|
| 97.51 | 1.24 | -3.19 |
| 93.48 | 1.24 | -3.19 |
| 91.18 | 1.24 | -3.19 |
| 86.21 | 1.24 | -3.19 |
| 81.7 | 1.24 | -3.19 |
| 72.95 | 1.24 | -3.19 |
| 61.8 | 1.083 | -3.27 |
| 52.08 | 0.488 | -3.55 |
| 42.45 | -0.54 | -4.05 |
| 33.35 | -1.91 | -4.72 |
| 25.49 | -3.4 | -5.44 |
| 20.09 | -4.59 | -6.02 |
| 18.57 | -4.95 | -6.2 |
| 16.27 | -5.52 | -6.47 |

M Range (56)

| M Range |
|---|
| 0.2 |
| 0.2 |
| 0.2 |
| 0.2 |
| 0.6 |
| 0.3 |
| 1 |
| 0.5 |
| 0.2 |
| 0.2 |
| 0.2 |
| 0.2 |
| 0.2 |
| 0.2 |

Output – Gray Balance (58)

| C' | M' (62) | Y' (64) | K' |
|---|---|---|---|
| 0 | 0 | 0 | 0 |
| 5 | 2.2215 | 2.5026 | 0 |
| 10 | 3.7212 | 4.0232 | 0 |
| 15 | 6.7564 | 6.8362 | 0 |
| 20 | 9.5363 | 1.3719 | 0 |
| 30 | 15.74 | 13.498 | 0 |
| 40 | 24.78 | 18.649 | 0 |
| 50 | 36.5 | 25 | 0 |
| 60 | 54.284 | 36.48 | 0 |
| 70 | 71.2 | 54.9 | 0 |
| 80 | 84.126 | 76.706 | 0 |
| 90 | 94.275 | 90.612 | 0 |
| 95 | 97.4 | 96.6 | 0 |
| 100 | 100 | 100 | 0 |

Y Range (60)

| Y Range |
|---|
| 0.2 |
| 0.2 |
| 0.2 |
| 0.2 |
| 0.6 |
| 0.3 |
| 1 |
| 0.5 |
| 0.2 |
| 0.2 |
| 0.2 |
| 0.2 |
| 0.2 |
| 0.2 |

L* BREAK = 70 (52)

Figure 4C

| K1 (66) | K2 (67) | K3 (68) | K4 (69) | K5 (70) |
|---|---|---|---|---|
| 0 | -0.39393939 | 0 | -0.15625 | 0 |
| -1.89189189 | 0.2972973 | -0.33333333 | 0.96666667 | -6.36363636 |
| 0.25833333 | -0.19166667 | 0.18181818 | -1.09090909 | -1.34782609 |
| -0.03921569 | -0.29411765 | 1.13636364 | -0.15909091 | 0.13333333 |
| 0.1682243 | -0.02803738 | -11.1666667 | -13 | -6 |
| -1.47368421 | -1.78947368 | 0.33333333 | -0.00775194 | 0.82352941 |
| -1.78870568 | -1.10344828 | 0.76372354 | -0.13953488 | 1.62101452 |
| -0.03500006 | -0.29378531 | -0.00948532 | -0.28625954 | 0.11913482 |
| 2.84743394 | 0.46428571 | 0.69897175 | 0.67647059 | 6.13293464 |
| 46.5292018 | -1 | 2.09261031 | 1 | -46.5292018 |
| 0.93450288 | 0.9375 | 2.20998481 | 2.20689655 | 0.99680307 |
| -1.98659696 | 0.63636364 | -6.25470278 | -3.5 | -3.12179523 |
| 0.34649338 | 0.09433962 | -0.70132554 | -0.4 | 3.67282986 |
| -0 | -1.76190476 | -0 | 4 | 0 |

| Mod(M) (72) | Mod(Y) (73) | Mod(P) (74) | M&Y horiz (75) | M&Y vertical (76) |
|---|---|---|---|---|
| 0.34481879 | 0.65306967 | 0 | FALSE | FALSE |
| 0.47010637 | 0.31953091 | 0.70710678 | FALSE | FALSE |
| 1.46478667 | 0.80361682 | 0.34014703 | FALSE | FALSE |
| 0.51478151 | 0.46486557 | 0.50039984 | FALSE | FALSE |
| 1.32412235 | 0.06708204 | 0.69375788 | FALSE | FALSE |
| 0.19026298 | 1.33405397 | 0.51312766 | FALSE | FALSE |
| 0.62769419 | 1.83521116 | 1.67387508 | FALSE | FALSE |
| 1.92234232 | 2.67110464 | 0.06674889 | FALSE | FALSE |
| 0.36235342 | 0.36400549 | 0.83194682 | FALSE | FALSE |
| 0.39012818 | 0.39012818 | 0.93943881 | FALSE | FALSE |
| 0.71554175 | 0.41725292 | 0.70722884 | FALSE | FALSE |
| 0.2607681 | 0.1456022 | 0.50359503 | FALSE | FALSE |
| 0.53338541 | 0.15811388 | 0.21163882 | FALSE | FALSE |
| 0.26400758 | 0.37215588 | 0 | FALSE | FALSE |

Figure 5A

| K6 (71) | dM (81) | dY (82) | M' (83) | Y' (84) | Closeness (85) |
|---|---|---|---|---|---|
| -0 | 0 | 0 | 0 | 0 | 0 |
| -0.34482759 | -1.39258223 | 1.01282948 | 2.22148355 | 2.5025659 | 2.2129527 |
| -0.16666667 | 0.2424812 | 0.44634313 | 3.7212406 | 4.02317157 | 0.42327017 |
| -7.14285714 | 0.28182205 | 1.18119896 | 6.75636441 | 6.83623979 | 1.07643988 |
| 0.85897436 | -0.10616438 | -12.5468037 | 9.53630137 | 1.37191781 | 10.3419319 |
| -43 | -0.86519115 | 0.32662643 | 15.7404427 | 13.4979879 | 2.69693913 |
| -5.47335202 | -0.81975844 | 0.364933864 | 24.7802416 | 18.6493386 | 2.66670474 |
| 0.03313537 | 0 | 0 | 36.5 | 25 | 0.03472269 |
| 1.03326259 | 1.91991335 | -0.59979316 | 54.2839827 | 36.4800414 | 2.2959541 |
| 2.09261031 | #DIV/0! | #DIV/0! | 71.2 | 54.9 | 2.40802601 |
| 1.00139937 | -3.7059976 | 3.02786014 | 84.12588 | 76.705572 | 1.69496439 |
| 1.78705794 | -1.62447059 | -11.9403498 | 94.2751059 | 90.61193 | 3.45870489 |
| 1.75331385 | 0 | 0 | 97.4 | 96.6 | 1.33852145 |
| -0 | 0 | 0 | 100 | 100 | 0 |

| M&Y Parallel (77) | M Vertical (78) | Y Horiz (79) | Real Error (80) | dE (87) | Close (86) |
|---|---|---|---|---|---|
| FALSE | FALSE | FALSE | FALSE | 0.00 | 0.0 |
| FALSE | FALSE | FALSE | FALSE | 0.71 | 2.2 |
| FALSE | FALSE | FALSE | FALSE | 0.34 | 0.4 |
| FALSE | FALSE | FALSE | FALSE | 0.50 | 1.1 |
| FALSE | FALSE | FALSE | FALSE | 0.69 | 10.3 |
| FALSE | FALSE | FALSE | FALSE | 0.51 | 2.7 |
| FALSE | FALSE | FALSE | FALSE | 1.67 | 2.7 |
| FALSE | FALSE | FALSE | FALSE | 0.07 | 0.0 |
| FALSE | FALSE | FALSE | FALSE | 0.83 | 2.3 |
| FALSE | FALSE | FALSE | FALSE | 0.94 | 2.4 |
| FALSE | FALSE | FALSE | FALSE | 0.71 | 1.7 |
| FALSE | FALSE | FALSE | FALSE | 0.50 | 3.5 |
| FALSE | FALSE | FALSE | FALSE | 0.21 | 1.3 |
| FALSE | FALSE | FALSE | FALSE | 0.00 | 0.0 |

Figure 5B

Testing Conditions at Time of Profile Creation

| | |
|---|---|
| Date: | 11/04/99 |
| Device: | Epson Stylus 3000 Inkjet Printer |
| Device Serial #: | AEV0035237 |
| Media: | Epson Photo Quality Glossy Paper (S041124) |
| Ink Set: | K=S020118, C=S020130, M-S020126, Y=S020122 |
| Resolution: | 720x720 |
| Screening: | HDS Super Fine |

Figure 8

Section A — Enter Status T Measurements for Cyan and Black Here:

| | Status T Cyan | | Status T Black | |
|---|---|---|---|---|
| | Paper | 0.09 | Paper | 0.09 |
| | C100 | 1.62 | K100 | 1.80 |

Figure 9

```
CYAN
/Conversion Tables[
  <<
    /TableName(Status T(X.Rite))
    /SubtractPaperWhite true
    /TableValues [
      0.0900  1.0000  0.1046  0.9800  0.1195  0.9600  0.1347  0.9400  0.1502  0.9200
      0.1660  0.9000  0.2074  0.8500  0.2515  0.8000  0.3500  0.7000  0.4659  0.6000
      0.6037  0.5000  0.7679  0.4000  0.9515  0.3000  1.1832  0.2000  1.3009  0.1500
      1.4183  0.1000  1.5285  0.0500  1.6200  0.0000
    ]
  >>
```

Figure 10

```
/Conversion Tables[
  <<
    /TableName(Status T(X-Rite))
    /SubtractPaperWhite true
    /TableValues [
      0.0000 1.0000 2.0000 0.0000
    ]
  >>
]
```

Figure 11

| | | Enter CIELAB Measurements Here: | | | | | |
|---|---|---|---|---|---|---|---|
| Section B | | | | | | | |
| | | CIE | L* | a* | b* | | |
| | | Paper | 93.353 | 2.93 | -8.17 | | |
| | | CMY100 | 24.71 | -8.06 | -5.67 | | |
| | | | Lab-L | Lab-a | Lab-b | | |
| | | | 93.35 | 2.93 | -8.17 | | |

Figure 12

| /CyanValues | [ | 5 | 10 | 15 | 20 | 30 | 40 | 50 | 60 | 70 | 80 | 90 | 95] | def | Reference: No change |
|---|---|---|---|---|---|---|---|---|---|---|---|---|---|---|---|
| /MagentaValues | [ | | 1.0 | 3.0 | 5.0 | 8.0 | 18 | 25 | 30 | 37 | 50 | 55 | 65 | 80] | def | Change these values |
| /MagentaRanges | [ | | | 2 | 2 | 4 | 4 | 4 | 4 | 8 | 8 | 8 | 16 | 16] | def | for Magenta |
| /YellowValues | [ | | 1.0 | 3.0 | 5.0 | 7.0 | 15 | 22 | 25 | 32 | 45 | 50 | 58 | 70] | def | Change these values |
| /YellowRanges | [ | | | 2 | 2 | 4 | 4 | 4 | 4 | 8 | 8 | 8 | 16 | 16] | def | for Yellow |

Figure 13

```
/ChannelName (Cyan)
/ChannelColor /Cyan
/DefaultCurve [
    0.0  0.0
    1.0  1.0
]
```

Figure 14

Date: _____  Printer Type: _____

Print ID Measured: _____  Printer Serial Number: _____

| Cyan | Density Value | Black |
|---|---|---|
|  | 0 % (Paper) |  |
|  | 100 % (Colorant) |  |

| % Cyan | Reference | | | Actual | | | Optimum Gray | | |
|---|---|---|---|---|---|---|---|---|---|
|  | L | a | b | L | a | b | C | M | Y |
| 0 |  |  |  |  |  |  | 0 | 0 | 0 |
| 5 |  |  |  |  |  |  | 5 |  |  |
| 10 |  |  |  |  |  |  | 10 |  |  |
| 15 |  |  |  |  |  |  | 15 |  |  |
| 20 |  |  |  |  |  |  | 20 |  |  |
| 30 |  |  |  |  |  |  | 30 |  |  |
| 40 |  |  |  |  |  |  | 40 |  |  |
| 50 |  |  |  |  |  |  | 50 |  |  |
| 60 |  |  |  |  |  |  | 60 |  |  |
| 70 |  |  |  |  |  |  | 70 |  |  |
| 80 |  |  |  |  |  |  | 80 |  |  |
| 90 |  |  |  |  |  |  | 90 |  |  |
| 95 |  |  |  |  |  |  | 95 |  |  |
| 100 |  |  |  |  |  |  | 100 | 100 | 100 |

Figure 15

ESTABLISHING A REFERENCE PRINTER STATE USING A RECURSIVE TONE SCALE MATCHING

This application claims priority of U.S. Provisional Application Serial No. 60/279,049, filed on Mar. 27, 2001 which is hereby incorporated by reference in its entirety.

FIELD OF THE INVENTION

The present invention generally relates to color printing and the production of color prints. More specifically, this invention relates to determining the amount of color ink required to produce color prints via a method and apparatus for establishing a reference printer state using recursive tone scale matching.

BACKGROUND OF THE INVENTION

The production of a color print from an original print is typically performed either by a tricolor additive process or a white light subtractive process. A tricolor additive process is based on the premise of color addition, wherein specific amounts of the primary colors red, green and blue (RGB) are combined to reproduce a desired color, and the desired color produced is the combination of those red, green and blue colors added together. In the tricolor additive process, the combination of an equal amount of red, green and blue colors produces a neutral gray or white color, whereas the complete absence of red, green and blue colors yields the color black, which is the default color in a tricolor additive process. Thus, a tricolor additive process combines specific amounts of RGB color to produce a desired color.

In contrast, a white light subtractive process operates on the premise of color absorption, wherein specific amounts of the subtractive primaries cyan, magenta and yellow (CMY) are combined to reproduce a desired color, and the desired color produced is equal to the combination of those cyan, magenta and yellow colors added together. Each of the subtractive primaries cyan, magenta and yellow is the opposite of one of the primary colors, and is equal to the color white minus its opposite primary color. This is equivalent to filtering the primary color from the color white. For instance, the color cyan is the opposite of the color red and is produced by filtering the red color component of white light, thereby yielding the residual colors blue and green. Similarly, the color magenta is the opposite of the color green and is produced by filtering the green color component from white light, thereby yielding the residual colors red and blue. Finally, the color yellow is the opposite of the color blue and is produced by filtering the blue color component from white light, thereby yielding the residual colors red and green.

In the white light subtractive process, a desired color is produced by combining CMY colors that selectively absorb specific amounts of red, green and blue from the color white. Thus, the combination of an equal amount of cyan, magenta and yellow absorbs equal amounts of red, green and blue color from the color white, respectively, yielding a neutral gray or black color. Similarly, the color produced from the complete absence of cyan, magenta and yellow is the color white, which is the default color for a white light subtractive process. When producing color prints using cyan, magenta and yellow inks, the combination of these inks to produce the color black is often not dark enough. To correct this problem, the separate color black (K) is often added to the colors cyan, magenta and yellow to create color prints. Thus, a white light subtractive process combines specific amounts of CMYK inks to produce a desired color.

Regardless of whether the printer applies a tricolor additive process using RGB colors or inks, or a white light subtractive process using CMYK colors or inks, a desired color is produced by combining different amounts, or values, of these colors or inks. The desired color produced is the sum of the color densities or luminescence of the constituent color components. Color density is the logarithm of the ratio of incident light to transmitted or reflected light, and thus measures color absorption on a logarithmic scale. For example, a color density of 2.0 means that the amount of incident light is one hundred times the amount of reflected light, i.e., that 99% of the incident light is absorbed. Luminescence is the opposite of color density, and is equal to the intensity of light per unit area of source. Measured logarithmically, a luminescence of 2.0 indicates that the amount of incident light is equal to one hundred times the amount of reflected light. Dark areas or shadows have a high color density and low luminescence, whereas light areas or highlights have a low color density and high luminescence. A spectrophotometer can determine the actual color and density of a printed color patch. CIELAB, commonly referred to as LAB, includes three measurements: $L^*$ is the measurement of lightness-darkness, $a^*$ is the measurement of greenness-redness, and $b^*$ is the measurement of yellowness-blueness.

Whenever creating a color print using RGB or CMYK inks, it is often desirable or necessary to create a color profile (e.g., an International Color Consortium or ICC profile) for the printer creating the color print. A color profile is used to translate an input color from an input media into an output color in an output media. For instance, it may be desirable to translate a color image displayed on an RGB monitor to a color print produced by a CMYK color printer. In this instance, the RGB monitor and its RGB image are the input media and input colors, respectively, and the CMYK color printer and CMYK color print are the output media and output colors, respectively. The printer's color profile translates the RGB color values from the monitor to the corresponding CMYK color values for the printer. Thus, the color profile includes those CMYK ink values that will produce the desired printer colors corresponding to the input RGB colors from the monitor. Color profiles are not limited to RGB-CMYK translations, but can also be used for RGB—RGB, CMYK-RGB, and CMYK—CMYK media translations.

In order to create a color profile, it is necessary to create a reference printer state that establishes how much of each color of printing ink must be combined to produce a desired color. It is necessary to determine these color ink value combinations for a number of practical reasons. The primary reason is that impurities and variances within different printer inks and printer paper cause the actual ink values required to produce a desired color to deviate from the theoretical ink values required to produce a desired color. For instance, a combination of equal cyan, magenta and yellow ink values would theoretically produce a neutral gray tone, but in actuality the color IF produced may differ due to absorption variations and impurities within the CMYK inks. Thus, it is necessary to determine the actual CMYK ink values required to produce the desired colors necessary to produce a real color print.

When establishing a printer reference state, a number of features are desirable. First, it is desirable that color balance is achieved such that when a certain amount of cyan, magenta and yellow ink is applied to the substrate, a neutral or gray color is produced. It is also desirable that the printer response be similar to that of a conventional printing system like a printing press. Typically, the reason for gray balancing is due to the fact that equal amounts of CYM ink typically do not produce a gray color. Therefore, the necessary amounts of CYM ink must be calculated for each CMY inkset, paper, and device combination for the entire tonal scale. A tonal scale is the spectrum of light to dark tones for a color. The maximum amount or percentage of ink of each of colorant produces the darkest tone and the minimum amount or percentage of ink produces the lightest tone. A conventional printing system typically prints a series of patches at the quarter, mid and three-quarter tones such that the amount of cyan ink is fixed and the amounts of magenta and yellow inks are varied. The color print is made up in a grid pattern, typically 10×10, and then compared to a known gray at these three tone levels. The inking combination that achieves gray balance for this printing condition is recorded for the three tones and is used in the preparation of files upstream from the press. The value in having a gray balance condition within a printing system is that this information can then be used to successfully apply UCR (Under Cover Removal) or GCR (Gray Component Replacement) printing techniques.

Prior art methods for determining a printer reference state have a number of significant shortcomings. First, they typically require manual visual inspection of color prints in order to make a subjective determination that the desired printer response and printer reference state is achieved. This is obviously undesirable, as such a determination will vary from person to person and is subject to individual error. Second, even assuming that a manual visual inspection is not subject to error, the process used to determine the reference printer state via visual inspection is largely comprised of trial and error, thereby requiring a lengthy and imprecise process to establish a reference printer state. Thus, it is desirable that the process used to determine a reference printer state be an automatic, objective process that accurately and efficiently determines the reference printer state.

Various approaches to establishing reference printer states and color correction are disclosed in U.S. Pat. Nos. 4,092,067; 4,182,560; 4,192,605; 4,468,123; 4,873,546; 5,293,258; 5,231,504; and 5,612,903, all of which are incorporated herein by reference.

SUMMARY OF THE INVENTION

These and other deficiencies in establishing a reference printer state are addressed by the present invention, which is a method for establishing a reference printer state via recursive tone scale matching. The present invention includes the ability to determine the amount of cyan, magenta and yellow ink necessary to produce a neutral color and thereby achieve color balance with high accuracy. The present invention also includes the ability to specify and match a tone scale reproduction curve thereby enabling optimal color reproduction. The present invention further establishes the reference printer state automatically and objectively, thereby determining the printer reference state quickly and accurately. Although the present invention is described using CMYK inks and colors corresponding to white light subtractive print methods and processes, those skilled in the art will recognize that the present invention is also applicable to RGB inks and colors corresponding to color additive print methods and processes.

BRIEF DESCRIPTION OF THE DRAWINGS

The foregoing and other features of the present invention will be more readily apparent from the following detailed description and drawings of illustrative embodiments of the invention in which:

FIG. 4 is a set of charts showing the values of the various patches;

FIG. 5 is a set of charts showing intermediate calculations;

FIG. 8 shows the testing conditions data;

FIG. 9 shows the status T data entry;

FIG. 10 shows the replacement conversion table from the spreadsheet;

FIG. 11 shows the original conversion table in the profile template;

FIG. 12 shows the data entry for Lab of paper white and CMY 100 overprint;

FIG. 13 shows the neutral balance file adjustment values for the 5% cyan example;

FIG. 14 shows the original default curve data from the linear device; and

FIG. 15 shows the gray balancing density method data sheet.

DETAILED DESCRIPTION OF THE PREFERRED EMBODIMENT

In the preferred embodiment, through a series of user selectable features and automated measurements, a raw digital printing device produces a tonally modified and gray balanced profile. This profile represents an 18% dot gain response and is therefore suitable for producing high quality color profiles for proofing simulation. A recursive algorithm is used to determine the ideal color, as well as calculate the appropriate tonal curves for the printing device. Through a series of iteration, color prints are matched against a tonal curve and neutral response curve in such a way so as to produce the desired grayness. The desired printer response and reference printer state are produced by matching the color output produced by the combination of different amounts of CMYK ink to a tone reproduction curve.

Figure 1:
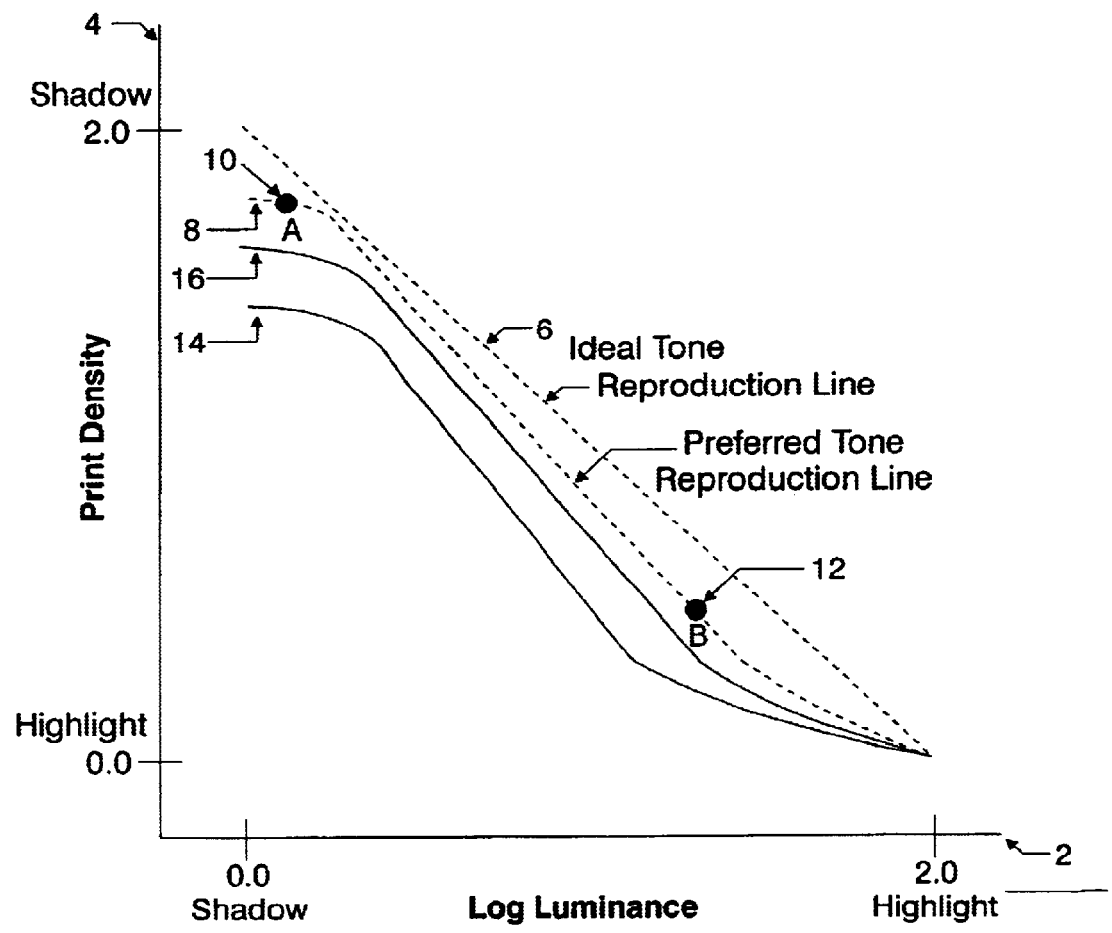
FIG. 1 is a graph of a tone reproduction curve.

FIG. 1 is a graph of a tone reproduction curve, which shows the relationship between output tones and input tones for an input and output color media. The horizontal axis 2 shows the luminance of the input tones in a logarithmic form. The brightness of color varies directly with luminescence, and thus high luminescence values correspond to lighter colors or highlights. The vertical axis 4 shows the print density of the output tones generated by the printer. The brightness of color varies inversely with density, and thus high density values correspond to darker colors or shadows.

The ideal tone reproduction curve 6 is a graphical depiction of ideal tone reproduction, wherein the output tones produced are identical to their corresponding input tones. Ideal reproduction is usually both impossible to accomplish and undesirable. In contrast, the preferred tone reproduction curve 8 is a graphical depiction of a preferred tone reproduction, often referred to as an "aimed curve," wherein certain tones are compressed or expanded to make an output color darker or lighter, respectively, than its corresponding input tone. For instance, at point A 10 where the slope of the tone reproduction curve 8 is less than forty-five degrees, tone compression occurs and there is less contrast between the output tones relative to their corresponding input tones. In contrast, at point B 12 where the slope of the tone reproduction curve is greater than forty-five degrees, tone expansion occurs and there is greater contrast between the output tones relative to their corresponding input tones.

Two additional trial tone reproduction curves 14 and 16 are also shown. These trial tone reproduction curves 14 and 16 may represent the tone reproduction curves produced according to a first and second color print, respectively, produced according to the present invention. In such a representation, the aimed reproduction curve 8 represents the desired tone reproduction response for the printer. The present invention recursively produces trial tone reproduction curves and attempts to match them to the aimed curve 8. The second trial tone reproduction curve 16 shown is a better match to the aimed curve than the first trial tone reproduction curve 14. Additional trial tone reproduction curves may be produced according to the present invention until a satisfactory fit, and hence desired printer response, is achieved.

Figure 2:
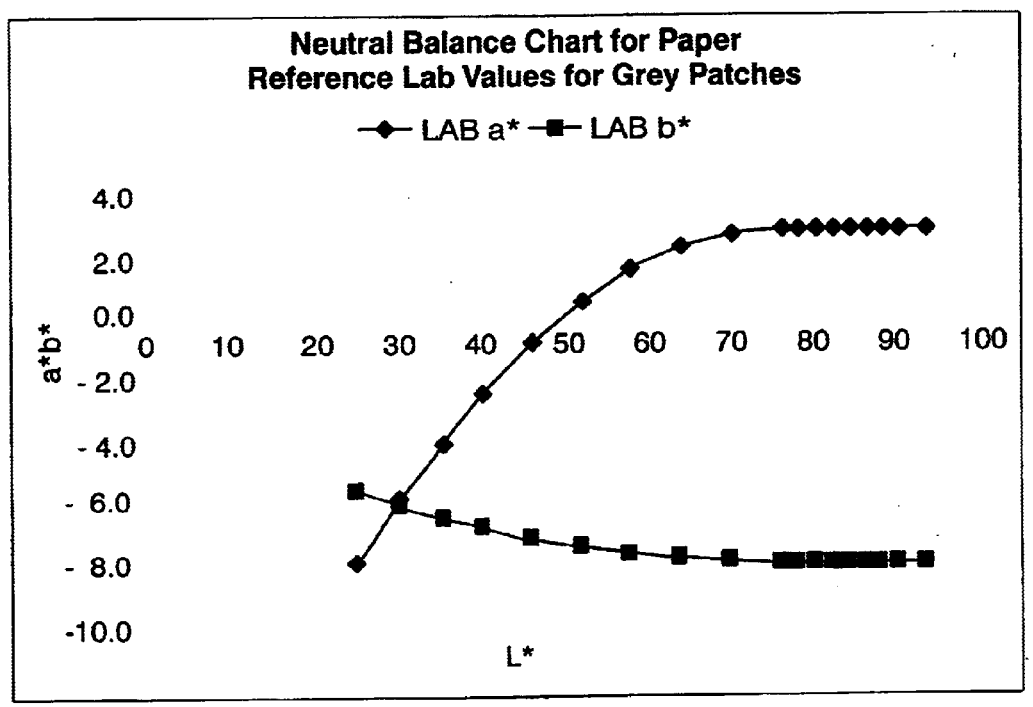
FIG. 2 is a graph of a target neutral response.

Referring now to FIG. 2, therein is illustrated a graph of the neutral response curve for a* and b* values as a function of L* values. The graph is a visual representation of the gray color to be achieved by the automated gray balance iteration process. Starting with the color of the paper which are the a* b* values on the right of the chart and in this case an L* value of 94. The first patch with no ink is the color of the paper with a color value or grayness of L* 94, a* 2.6, b*−8.2 which is a white paper with a slight bluish cast. The measurements of the patch on the paper with the maximum ink, becomes the value all the way to the left on the chart. This is the result on the limitations of the inks, paper combination and therefore is fixed. Since the paper is fixed and the maximum ink is fixed, a smooth curve is calculated between the two keeping the grayness of the paper as long as possible before transitioning to the max ink patch.

Figure 3:
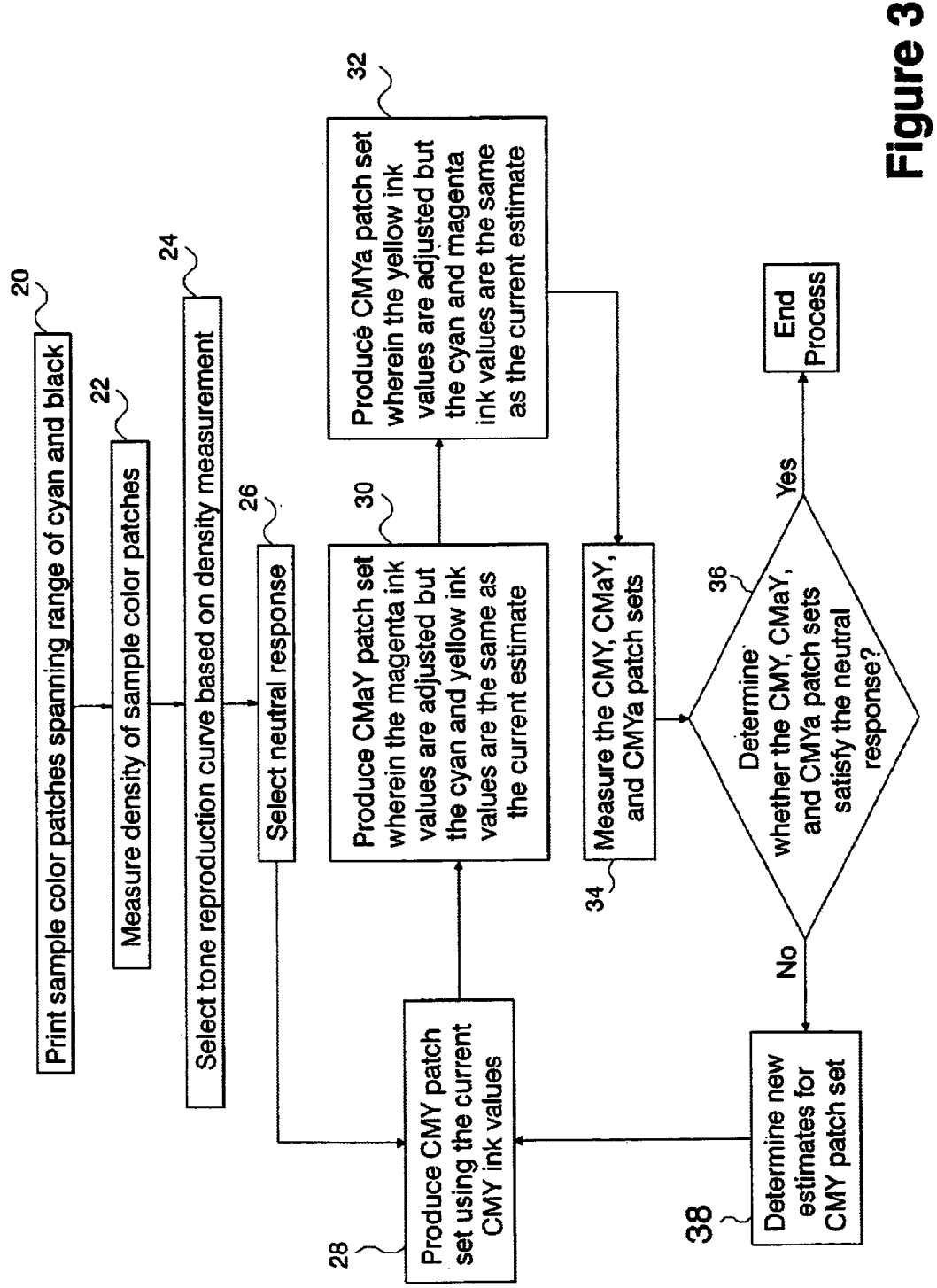
FIG. 3 is a flowchart showing the process of determining the reference printer state.

FIG. 3 is a flowchart showing the method for producing the reference printer state by recursively determining values for a set of CMY patches on a color print. The process is recursive in that the measurements of the current CMY patches are used to determine the next set of CMYK patches which are closer to the desired tone reproduction curve and neutral response. Once the CMY patches produced by the printer sufficiently match the desired tone reproduction curve and neutral response, then the desired printer response is achieved. When completed this process determines the amount of ink for each color, cyan, magenta, and yellow ink necessary to produce the desired gray balance on each patch of CMY in the tonal scale.

At step 20, a plurality of sample color patches spanning the tonal scale are printed. The amount of ink for each colorant is indicated by a percentage value. The increments may be, for example, from 0 to 100 in steps of 10. In the example presented, 14 patches are used with ink percentages 0, 5, 10, 15, 20, 30, 40, 50, 60, 70, 80, 90, 95, and 100. The spectrum of ink percentages corresponds to the tonal scale ranging from light (low percentage of ink) to dark tones (high percentage of ink). The need for additional patches over the press method described above is due to the fact that digital color printers do not print linearly, and thus, additional points of data are collected along the curve to improve accuracy. CMYK ink values are set to the initial color estimates. The initial estimates may be fixed at equal percentages of each colorant for each tone of the tonal scale. For example, one sample patch is 5, 5, 5, CMY and the sample next patch is 10, 10, 10, CMY and so on until 100, 100, 100, CMY is reached. Theoretically, if inks were pure then this would produce a gray scale tonal scale and the process would be complete. However, in practice equal percentages of the colorants do not produce an evenly distributed gray scale.

At step 22, the sample patches are measured with one of the common industry automated spectrophotometers to measure density and to determine the density range of the ink, substrate, and device combination in Status T or some other density measurement standard. (A densitometer could be used here but a device capable of measuring and reporting CIELAB values will be needed later in the process and thus a spectrophotometer is suggested here as it measures both density and CIELAB.)

At step 24, the desired tone reproduction curve for the desired printer response is selected. The tone reproduction curve is determined based on the density range of the Cyan and Black inks. A curve-adjusting algorithm, such as CKP curve or Yule-Nielson, or Murry Davies, is applied to achieve the tonally corrected curve. The CKP curve and other algorithms produce a visually smooth ramp of patches from 0 to 100% ink. For example in FIG. 1, curve 10 is tonally corrected. Alternatively, it is possible to use magenta and black inks instead. A close approximation to an 18% dot gain at the 50% patch is sought as well. The 18% dot gain is desirable, as it is a middle value for most printing processes, possibly with the exception of newspaper printing.

At step 26, the desired neutral response for ink, substrate, and printer response is then selected. A desired neutral response is needed in order for the recursive gray balance process to have aim values (target values) through the tonal curve. For example, the color of the paper does not change, so that could be considered a neutral response. The neutral response for a printing device is also limited by the actual color of the 100% CMY patch. (The actual color is typically determined by measurement using for example a spectrophotometer.) This color is typically not gray because of the non-pure inks and is dependent on what order the colorants are printed and the amount of each colorant the device puts onto the substrate. Because of this limitation, decisions must be made, and a means provided to transition from neutral grayness to the color of the 100% CMY patch, also known as overprint. This is different from the tone reproduction curve in that the desired curve is not fixed but is defined against an intended criteria. Based on testing, the LAB value of the paper (the measured color of the paper in LAB color space) is used as the initial neutral response and then transitions toward the 100% CMY patch at some user defined L* break value. In FIG. 2, the L* break is 70.

The smoothness of the transition is dependent on the degree of non-grayness or color of the CMY 100% patch and the point at which in L*, the color should begin to change from the neutrality of the paper to the color of the CMY 100% patch. The goal is to select an L* break value in which the subsequent density curves in the final profile plots as a smooth curve and there are no flat areas in the curve because the L* value was selected too high. Thus, the grayness of the CMY 100% overprint patch is determined by measurement and a suitable L* break value is selected from within the gray balance utility to insure a smooth curve. The cyan and black are calculated tone curves which produce a visually smooth gradient throughout the tonal scale.

After printing and measuring the plurality of sample color patches (e.g., cyan and black) and selection of the desired tone reproduction curve and neutral response, the recursive process is started by producing a color print with three sets of CMY patches corresponding to the printer's response of the current CMY ink estimate. At step 28, the first set of CMY patches, referred to as the CMY patch set, is produced on the color print. The CMY patch set is printed using the current CMY ink value estimate. In the first pass, the current CMY ink value estimate is the initial CMY ink value estimate. The initial ink values may be determined from sample prints of the particular type of device, as described above. In subsequent passes, the current CMY ink value estimate is the CMY ink estimate from the last pass at step 38.

At step 30, a second set of CMY patches, referred to as the CMaY patch set, is produced on the color print wherein the estimates of the amount of magenta ink are adjusted from the first patch set, but the estimates for the amount of cyan and yellow ink remain the same as the first patch set.

At step 32, a third set of patches, referred to as the CMYa patch set, is produced on the colored print wherein the estimates of the amount of yellow ink are adjusted from the first patch set, but the estimates for the amount of cyan and magenta ink remain the same as the first patch set.

The initial CMaY and CMYa estimates encompass the optimized cyan curve for each patch along with scales as calculated above. The magenta and yellow values start from the initial sample in this case 14 patches spanning the tonal scale from 0 to 100% ink with an added variation range based on where the patch is in the scale. For example, for a 10% patch the ink variation for magenta may be 10% plus 4% and minus 4%. At higher patch values such as 60% the range changes to plus 12% and minus 12%. These maybe arbitrary starting values contained in the initial description and can be modified or optimized as needed. Alternatively, few test prints are made and the results observed are then used to set the starting points. Generally, the amount of variation is increased along the scale in density, since more colorant is required at darker colors to observe a change in perceived color. The accuracy of these initial estimates is not critical, as the iteration process quickly adjusts these first estimates. The yellow and magenta tone curves are realized when the gray balance for all the patches on the scale are obtained to within user specified tolerance.

Thus, the color print includes the CMY patch set, the CMaY patch set and the CMYa patch set with the original CMY ink value estimate, adjusted magenta ink value estimate, and adjusted yellow ink value estimate, respectively. See for example, FIG. 4 charts 40–42. Each row of each chart represents a color patch. In this example, the print includes 42 total patches, 3 patches for each of the 14 tonal values 5, 10, 20, . . . 90, 95, 100. The patches of the color print are arranged in three columns. The middle column (42) includes no change, or is the best estimate thus far in the process. The column to the left (40) changes the amount of yellow colorant. The column to the right (44) changes the amount of magenta colorant, again working toward achieving grayness.

At step 34, patch sets, CMY, CMaY and CMYa, are measured using an appropriate measuring device such as a densitometer, colorimeter or a spectrodensitometer. The actual color is determined by CIELAB measurements comprising of L* indicating lightness/darkness, a* indicating greenness-redness, and b* indicating yellowness-blueness. Measurements of L*, a* and b* values are collected to two decimal places for all 42 patches. The data is captured and the collected data is used to produce the next iteration of patches. The measurements of the CMY, CMaY and CMYa patch sets and their corresponding known CMY ink values used to produce these patch sets are then used to perform new estimates of the necessary CMY ink values to generate the desired printer response. For example, in FIG. 4, charts 46–50 provide the measurements corresponding to the color patches represented by charts 40–44, respectively.

The goal is to match the LAB value determined by the neutral component of the paper in a* b* and the variation based on the L* crossover point where the color is calculated based on drawing a smooth curve to the 100 CMY patch or its corresponding a* b* color value.

Next the process determines if the current printer response, indicated by the measurements of patches of the current color print, matches the desired printer response including the desired tone reproduction curve and neutral response. The neutral response curve produces the intended gray balance LAB data values which are then compared to the printed target measured values. The iteration process seeks the closest match until the user defined accuracy is achieved.

At step 36, the measurements are then compared with the values to the desired color patches. Based on the measurements, the direction of change can be determined by whether or not the error is larger or smaller than the center column values which are recalculated and another iteration chart is printed.

At step 38, if the new values in the left or right column are closer than the center values, then these closer values become the new center values in the next iteration. As the differences become smaller based on the measurements, so does the amount of variation from the center column to the magenta and yellow columns. Thus, not only are the values compared each iteration looking for a more accurate value, but also as the color is becoming closer to the intended value, so does the degree of precision as the degree of change is being reduced, thereby approaching the intended value more quickly, but also more accurately. Again, no black ink is used since the process is trying to match the black with the other three colors only.

If the desired printer response has been achieved, then the process ends because the desired reference printer state has been determined. The data or gray balance values are then merged with the patch request (0, 10, 20, . . . ) value to produce a default curve which is then used to convert the data from the file as it is sent to the printer which then produces the reference state. This information is contained in a profile data format. In addition, once the default curve is created, calibration data can also be determined and automatically incorporated into the reference state profile for density measurement calibration of printers of the same device type, but not the same reference printer.

If the desired printer response has not been achieved, then the process proceeds to step 38, wherein a new CMY ink value estimate is determined based on the CMY, CMaY and CMYa patch set measurements. For example in FIG. 4, chart 58 is determined by a comparison of the LAB Values of the color patches, charts 46–50, to the neutral response, chart 45. In chart 58, the cyan values remain constant, i.e., the same as the initial spanning indicated in chart 4. The magenta values, col. 62, cue a function of the magenta values from either chart 42 or chart 44 depending on whether charts 48 or 50 is closer to chart 54, the target response. The yellow values, col. 64, are a function of the yellow values from either chart 42 or 40, depending on whether the chart 46 or chart 48 is closer to the target chart 54. Chart 58 becomes the new values for chart 42 when the process is repeated.

This new CMY ink value estimate becomes the current CMY ink value estimate, and the process proceeds to step 28 where a new color print with the corresponding new CMY, CMaY and CMYa patch sets are produced. To determine charts 40 and 42 for the next iteration, charts 56 and 60 are determined. Chart 56 shows the amount to adjust the yellow when producing chart 40 in the next iteration. Chart 60 shows amount to adjust the magenta when producing chart 44 in the next iteration. FIG. 5, columns 66–87, shows the intermediate calculations in determining columns 62, 64, 60, and 56.

This sub-process of creating a new color print based on new CMY ink value estimates, measuring the color response based on the new color print, and then determining new CMY ink value estimates continues recursively until the desired printer response, and hence reference printer state, is achieved.

After determining the new CMY ink value estimate (step 38), a new color print that includes CMY (step 28), CMaY (step 30) and CMYa (step 32) patch sets created from the new CMY ink value estimate is created. This new color print is measured (step 34) using an appropriate color measuring device, to determine L*, a*, and b* values. These measurements and known CMY ink values are used to determine yet another estimate of the necessary CMY ink values. This process of creating a new color print including CMY, CMaY and CMYa patch sets, measuring the patch sets, and determining a new estimate of the necessary CMY ink values from the patch set measurements is repeated recursively until the desired printer response, and hence printer reference state, is achieved. Printer response refers to the amount of colorant placed on the substrate for a given device code sent to that printer. The amount of colorant needed is determined by the measurement of the patches followed by an iteration to determine the direction and amount of color change produced. Thus, a numerical value is sent to the printer and is converted to an amount of ink delivered. One of the goals of the print, measure, calculate process is to arrive at the intended a* b* values for each middle patch which are as close as possible to the requested or intended values. The tone reproduction curve for C and K is determined, for example, by calculation, as described in relation to step 24. The M and Y tone reproduction curves are determined by the necessary amounts of each, at each tone value in the target in combination with C that produces the required gray. The neutral response curve is used to determine the values needed to obtain gray balance by measurement of a* b*.

The following is an example of the calibration process for creating linear profiles described above. The calibration procedure produces a starting point for CMYK printers. The calibration process linearizes the CMYK color scales to reduce 'over inking', and to gray balance the CMY color combinations throughout the tonal scale. The end product of the procedure is a fully functional Linear profile that contains Status T aim values and default curve reference data that represents the current device in its ideal calibrated condition or Golden State. (This profile is not necessarily linear in response but it is optimized for the device, screening, resolution, ink, and media (or substrate) being used.)

Once achieved, this profile is a good basis for two activities: (1) The use of the printer without a color management option in ScriptWorks. The initial results are much better than with a truly raw device and the calibration required to compensate for differences between units and day-to-day variation are much simpler. (2) Full color characterization for profiling and color management. This procedure has been optimized for print profiling and provides a good starting point for color management work.

To complete the procedure, the following items of hardware, software, and support files are used. The hardware includes: A representative printer of the type requiring a linear profile, with sufficient ink and media supplies to make several A4 or US Letter sized prints. A Macintosh or PC, capable of running a color management application such as ScriptWorks 5.0 or later and Genlin. (The UNIX operating system is also suitable for printing and measuring, but it is slightly less convenient to use the spreadsheet.) A measuring instrument such as a Densitometer (or calorimeter) capable of producing Status T measurements. (For example, an X-Rite DTP41 is assumed in the documented procedure.) Densitometer calibration target(s) are used. A measuring instrument such as a Colorimeter capable of reading CIELAB values. (For example, an X-Rite 938 is assumed in the documented procedure.) A suit-able colorimeter may be used for Status T measurements as well. For example a spectrophotometer may be used. Suitable cables to connect your measuring instrument to the computer. For example, X-Rite produce: X-Rite/Macintosh Interface Cable (Part No. SE108-92-01 and 8 pin mini-DIN to Macintosh computer); and X-Rite/PC Interface Cable (Part No. SE108-92-01 and DB9 Adapter to PC computer).

The software includes: Color management application such as ScriptWorks version 5.0 or later, and a compatible version of Genlin. An application embodying the process of the present invention, such as ScriptWorks plugin capable of driving the printer for which a linear profile is being developed. A spreadsheet application such as Microsoft Excel, version 5.0 or later. (It is more convenient, but not essential, to use this on the computer running ScriptWorks and Genlin.) A text editor, capable of saving unformatted text. (For example, use SimpleText on Macintosh computers or WordPad on PC-based Windows platforms.)

In this example the following files are used: DensityGray-Balance.xls; Linear-Density.prf; Neutralbalance file; and Linear-3-B.ps. Both the calibration prints and measurements taken from them are representative and repeatable.

Before starting the procedure, and when resuming this procedure after any significant interruption, make sure that the printer and the measuring devices are in a proper operating condition. Follow any specific instructions in the manufacturer's documentation. If there is no such advice, follow these guidelines.

Printer preparation and use: install and operate the printer in a clean and stable environment; allow time for the machine to reach operating temperature; perform any cleaning or self-calibration procedures before making test prints for measurement; if there is a significant delay between making prints and taking measurements, ensure that the storage conditions of the prints are consistent; and avoid bright light, high temperatures, and extremes of other harmful conditions while storing or transporting prints.

Densitometer calibration and use: Calibrate the measuring instruments before taking measurements. Use the correct calibration plaque supplied for each device and the procedures outlined in the documentation for the device. This reduces any possible error due to drift from the calibrated state before taking actual measurements. It also allows return to a known state should the procedure require more than one working session. When taking measurements, place an identical piece of paper under the print being read. This reduces the effect of any translucency in the media.

ScriptWorks and the plugin: Start with a fresh installation of ScriptWorks, without any version of the plugin. Install the plugin in this ScriptWorks installation.

General care: Copy the files so that the original data is preserved because the new date is written over the old data.

Figure 6:
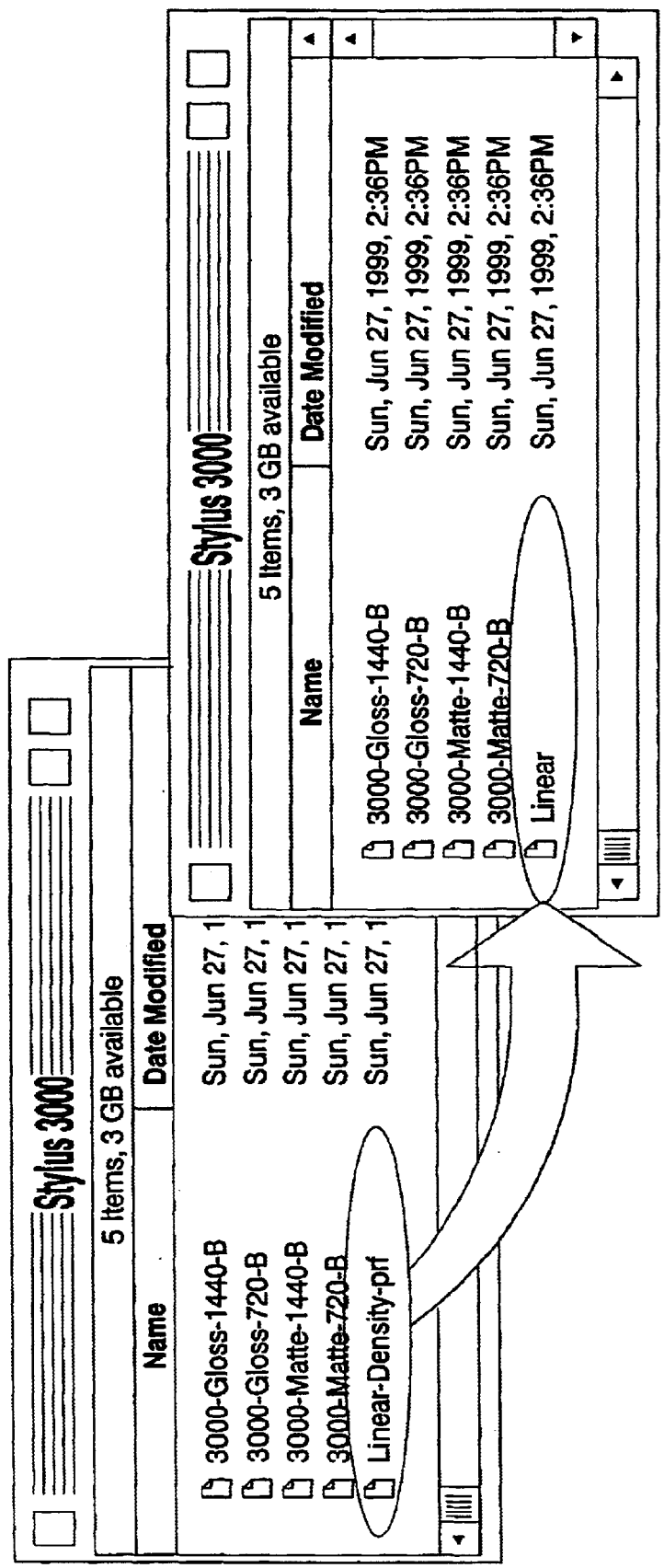
FIG. 6 shows the step of renaming the linear profile.

Step 1: Set up the correct working profile. Copy the file Linear-Density.prf into the Profiles folder for the device being profiled. Rename the copy of Linear-Density.prf to Linear as shown in FIG. 6. At this stage, the profile uses a straight line default calibration, needed for gray balancing. Create a page setup in ScriptWorks that includes the correct output device, screening, and resolution, and then save the page setup with a relevant name.

Step 2: Print an uncalibrated reference target. Load the desired media (substrate) and colorant in the printer. Open the Output>Print Calibration window, select the page setup that was created in Step 1, and print an uncalibrated target. Make a note of the unique reference number printed on the calibration target (after the label Reference Number).

Figure 7:
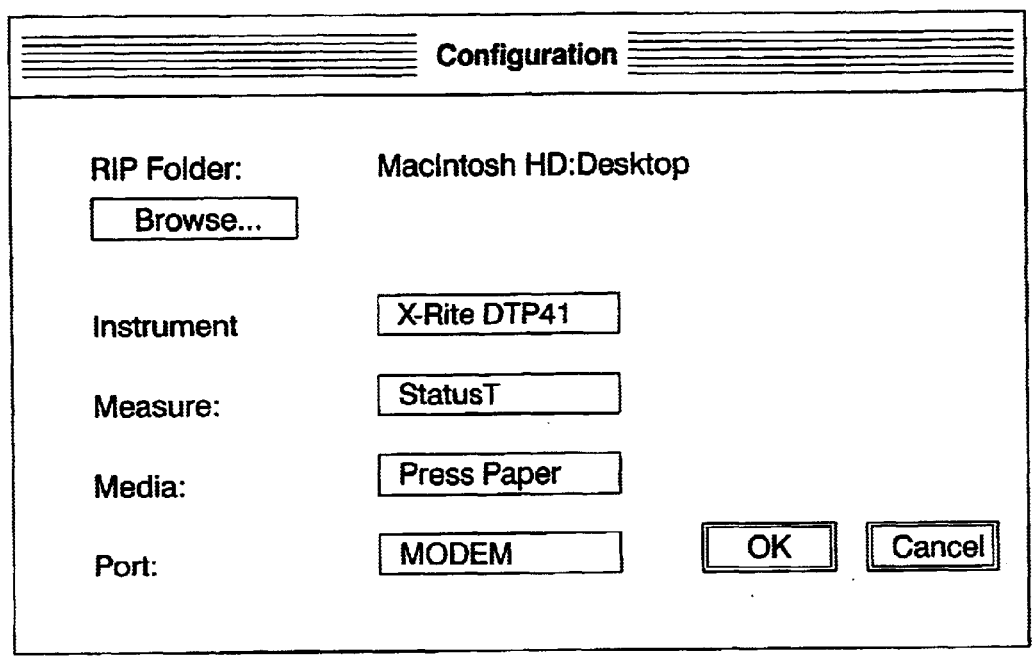
FIG. 7 shows the Genlin configuration dialog box.

Step 3: Configure and measure with Genlin. Using the correct cable, connect the DTP41 to the computer where ScriptWorks is installed. Configure Genlin for the measuring instrument and communication port; for Measure, select StatusT; and for Media, select Press Paper. (FIG. 7 shows the Configuration dialog box on Macintosh. See Technical Notes Hqn026 and Hqn042 for more information on Genlin, if needed.) Measure the Cyan and Black strips of the uncalibrated target in Status T making sure that the reference number selected in Genlin corresponds to the reference number on the target being measured. After measuring, open the RIP_folder/SW/caldata/import file generated by Genlin, and extract the measurements of the 0% Cyan patch (labeled C0, and representing the paper color), 100% Cyan patch (C100), 0% Black patch (K0, also paper), and 100% Black patch (K100). Write down these values or save them in a small text file.

Step 4: Start using the spreadsheet. Open the Excel file named DensityGrayBalance.xls. It should open to the first worksheet, labeled Input-Output Data. Display the top portion of this worksheet. Enter the testing conditions in the presented fields and save the Excel spreadsheet with a unique name for the device being worked on. FIG. 8 shows the format within Excel for the data. The second part of the spreadsheet uses a mathematical method for calculating the range of ideal Status T aim values for the Cyan and Black channels from the measurements of 0% Cyan, 100% Cyan, 0% Black, and 100% Black. The Status T values are calculated by curve fitting between 0% and 100% using a curve-adjusting algorithm such as CKP curve. The curve may be similar to an 18% dot gain curve for the highlight colors (defined here as 0% through 30%) and closer to a true linear curve for the dark colors (defined here as 70 through 100%). The selected curve may be adjusted to give the best distribution of density throughout the tonal scale for Cyan and Black. Taking the values obtained in Step 3—C0, C100, K0, and K100—add them to the spreadsheet in the proper location, as shown in FIG. 9. The spreadsheet uses these values to calculate the theoretical aim values using the actual device measurement values from the original uncalibrated print to create a calibration set for the RIP. This calibration set applies the new calibration to the Cyan and Black channels while leaving Magenta and Yellow unchanged. To make this calibration set effective, cut and paste the newly generated values into our Linear profile. Scroll down further in the spreadsheet under the cell containing Section A until the conversion tables for Cyan and Black are visible. (FIG. 10 shows one of these tables.) Copy the Cyan table from Excel and then paste it into the Linear profile, replacing what is already there in the/ConversionTables section under the/Linearisation section starting with/ChannelName (Cyan). Repeat this copy and paste operation for the Black table, pasting it into the Black section of the profile. FIG. 11 shows exactly what in the Linear profile needs to be replaced, for both Cyan and Black table values. The Cyan and Black channels now contain Status T data.

Step 5: Obtain correct Magenta and Yellow values. The next step is to print a PostScript-language file containing near-gray patches (constructed by mixing C, M, and Y) and then to determine the amounts of Magenta and Yellow that will be required along with Cyan to produce the desired neutral gray result. Printing the file also generates a file of DefaultCurve values for later use. Select a neutral balance file. The neutral balance file may be edited to obtain as many patches as there are on a custom calibration target for your printer. Click New in the ScriptWorks Calibration Manager, to create a new calibration set for the device being profiled. The Edit Calibration (specifically "Edit uncalibrated target for new_device") dialog box appears. In this dialog box, select Linear in the Profile list. Click Import and select the Status T measurements for only the Cyan and Black values from the uncalibrated target measured in Step 3 of this procedure. Save the calibration set with a unique name such as new_device_Base_CK. Click OK to leave the Calibration Manager and save your changes. Display the Page Setup Manager, select the page setup you have been using, and click Edit to display the Edit Page Setup dialog box. Select the new calibration set, new_device_Base_CK, and click OK to exit both the Edit Page Setup and the Page Setup Manager dialog boxes. Print the file Neutral Balance file using your new page setup.

The use of the neutral balance file is an iterative process able to achieve very accurate gray balance. By gradually approaching the right combination of values through a combination of measurements and value adjustment, very accurate gray balance can be achieved. Using the calibrated calorimeter (in this example, assumed to be the X-Rite 938) measure both the paper and the CMY (100, 100, 100) overprint patch at the bottom left of the page. Place these measurements into the spreadsheet below the cell labeled Section B, in the box outlined in red (as shown in FIG. 12). When the spreadsheet recalculates itself, this data creates the chart labeled Gray Balance to Paper (Highlight): Reference Lab Values for Gray Patches also in Section B of the spreadsheet. After the values are entered in the red box, print this chart out at full-page size from Excel for easy reference. A typical chart is three landscape pages of A3 or Ledger size.

The intermediate Lab values within L* values of 30 through 90 are arbitrary and simply provide coordinate points to plot the curve. These values may be adjusted as necessary to create a suitable curve. By using the CMY overprint as one of the reference points on the graph, often but depending on the given device, this patch will have a considerable color shift. In order to not limit the color gamut of the device the grayness is being sacrificed somewhat in the 60–70% tone and above, with the severity deter-mined by the response of the output device at the 100% CMY overprint. This is why the curve deviates from gray and why this chart is needed in determining the magenta and yellow values. The L* 30–90 range may be adjusted to push the grayness further into the dark region as needed, but the default values usually provide good results. The patch grids may be far from gray and actually include a wide range of colors as the cyan amounts vary. The goal here is simply to produce the correct Lab values in the center patch of each grid for each cyan percentage based on the values from the chart just printed. This is accomplished by adjusting the amounts of M and Y in each patch grid then printing out a new test print, measuring, adjusting the values and so on.

To adjust the magenta and yellow values both in amount and range open the Neutral Balance file in a text editor and, using the instructions provided in the header of that file, adjust the values. FIG. 13 shows the values to change. You can consider the MagentaRanges and YellowRanges as an indication of the likely limits on changes to the corresponding MagentaValues and YellowValues. Record the reference Lab values from the curve, the actual Lab values of the measured patch, and the CMY values of the patch measured. These values may be recorded in the table shown in FIG. 15.

The iterative procedure is as follows: (1) Print the unmodified neutral balance file. (2) Measure patch values in each grid, seeking values from the graph. (3) Adjust values in the array within the neutral balance file header. (4) Save the file and print it. (5) Measure patch values in each grid, seeking values from the graph. Return to step 2 of this iterative procedure until the center patch in each grid matches values from the graph, or you can achieve no further improvement.

Part of the reason for using the Neutral balance file to determine the M and Y values for grayness is that an accurate Default Curve data file is generated by ScriptWorks for this device and condition. The data file is called DefaultCurve.dat, and it is put in the SW folder of the ScriptWorks installation from which the file was printed.

Step 6: Import DefaultCurve data. Open the DefaultCurve.dat file in a text editor to see the data generated by ScriptWorks. There are two columns of data for each colorant: Cyan, Magenta, Yellow, and Black. The magenta and yellow are derived from the values we placed in the array in the neutral balance file, whereas the Black and Cyan are not. Cut and paste each of the four sections of this newly generated default curve data into the correct location of the Linear profile. FIG. 14 shows an example, in this case for Cyan, of the location that needs replacing within the Linear profile. After pasting all sections into the profile, save the profile.

Step 7: Print a gray balance test file. Display the Page Setup Manager window within ScriptWorks, select new_device_Base then click Copy. In the New Page Setup window, deselect the calibration new_device_Base_CK, that is, select (None), and save the new page setup with a unique name such as new_device_Base_Def to signify that this is now using the Linear profile with the Default-Curve data newly added for the CMYK channels. Print the test file Linear-3-B.ps using this page setup (or a print a similar target file that contains CMY overprint patches) in order to evaluate the gray balance. The top rows on the page produced by Linear-3-B.ps are both similar to gray scales but one is a true grayscale in black, while the other is produced by combining C, M, and Y; both should look visually the same or very close, up to about 60%; and then, in the CMY row, the grayness will begin mapping towards the 100% CMY patch values.

Step 8: Obtain Status T values for M and Y. If the result of the print from Step 7 is satisfactory, print a calibration target using the current page setup, which will use the newly added data in the Linear profile. (Again, the only option is Print uncalibrated target.) Mark this print clearly to differentiate it from the first uncalibrated target printed at the beginning of this process. Note the reference number on this new print. Using Genlin, read the Magenta and Yellow strips matching the reference numbers. Return once again to the file SW/caldata/import, which now contains different values. Using a text editor, copy the Patch and Value data, then locate the table in the spreadsheet section below the cell labeled Section C. Use the Edit>Paste Special menu command, select the Values button, and click OK to import the data. Scroll down in the spreadsheet until the cut and paste area for the Status T values are visible. The Status T values are used for the/ConversionTables section of the Magenta and Yellow colorants. Copy this information and paste it into the proper place within the Linear profile, similar to the Cyan and Black channel earlier in this procedure—towards the end of Step 4. Save the profile. At this point, the Linear profile is fully functional, however it is not ready for release because the header information is unlikely to be accurate for this data or device.

Step 9: Make header information reflect profile data. In order for this profile to have a reliable meaning in production use, the header information must reflect the conditions and materials used at the time the Linear profile was made. The following is an example of the header data for Linear (but omits the comments section on gray balance).

---

%!PS-Adobe-3.0
%%Title: Linear-Density.prf
%%Creator: P Manwell
%%CreationDate: (99/8/12/13/48/00)
%%EndComments
/Profile <<
/ProfileVersion 1
/ProfileID (/NEUGEBAUER/peterm/1999/8/12/13/48/00)
/LastModified (99/8/12/14/03/00)
/ProfileColorSpace/DeviceCMYK
/DeviceType (Generic)
/DeviceSerialNumber ( )
/MediaType ( )
/ColorantType ( )
/Resolution [300 300]
/Halftone <</SpotFunction (HDS Super F)/Frequency 0>>
/ValidForComment ( )
/ValidForDeviceTypes [(Generic)]
/ValidForMediaTypes/Any
/ValidForColorantTypes/Any
/ValidForHalftones/Any
/ValidForResolutions/Any
/Comments ( )

---

Using the testing conditions information entered in the top section of the spreadsheet file we can update this information. First, make a copy of this working Linear profile prior to making header changes; this protects you from problems with items such as invisible spaces, which can cause processing errors. After making the copy, update the profile information.

The following is a header for the printing device used in this example, Linear (Epson Stylus 3000).

---

%%Title: Linear (01Nov99)
%%Creator: K Elsman
%%CreationDate: (99/2/16/12/3/45)
%%EndComments
/Profile <<
/ProfileVersion 1
/ProfileID (/BILLY/kelsman/1999/3/16/12/1/27)
/LastModified (99/2/16/12/3/45)
/ProfileColorSpace/DeviceCMYK
/DeviceType (Stylus Color 3000)

-continued

```
/DeviceSerialNumber (AEY0035237)
/MediaType (Epson;EPSON Photo Quality Inkjet paper S041062)
/ColorantType (Epson;K:S020118,C:S020130,M:S020126,Y:S020122)
/Resolution [720 720]
Halftone <</SpotFunction (HDS Super F)/Frequency 0>>
/ValidForComment ( )
/ValidForDeviceTypes [(Stylus Color 3000)]
/ValidForMediaTypes [(EPSON Photo Quality Inkjet paper S041062)
]/ValidForColorantTypes
[(K:S020118,C:S020130,M:S020126,Y:S020122)
]/ValidForHalftones/Any
/ValidForResolutions/Any
/Comments (Optimized for 720 x 720 Matte)
```

After making the necessary changes, add this newly modified Linear profile to the plugin and confirm that a calibration target can be printed. Next, open the Calibration Manager, edit the calibration set, and confirm that the Status T for each of the CMYK colorants can be specified and that a representative curve exists for each colorant. Finally make a test print of your choice to confirm that 'over inking' has been controlled and that a reasonable non-color managed print is the result.

The new Linear profile is optimized for one printer and condition. Using this profile and printing standard IT8/7.3 targets (or similar targets) for color managed workflows will yield excellent results.

While the invention has been particularly shown and described with reference to preferred embodiments thereof, it will be understood by those skilled in the art that various changes in form and details may be made therein without departing from the spirit and scope of the invention.

What is claimed:

1. A method for determining a gray balance comprising the steps of:
    a. Determining values for a first primary color, a second primary color and a third primary color defining colors representative of a tonal scale;
    b. Determining a neutral response comprising color values representative of the tonal scale;
    c. Printing a first set of color patches spanning the tonal scale according to the determined values for the first primary color, second primary color and third primary color;
    d. Adjusting the values of the second primary color spanning the tonal scale;
    e. Printing a second set of color patches spanning the tonal scale according to values of the first primary color, and the third primary color used in the first set of color patches and the adjusted second primary color;
    f. Adjusting the values of the third primary color spanning the tonal scale;
    g. Printing a third set of color patches spanning the tonal scale according to the values of the first primary color and the second primary color used in the first set of color patches, and the adjusted third primary color;
    h. Determining actual color values for each of the printed color patches in the first, second and third sets;
    i. For each color patch of the first set of color patches:
        i. Comparing the actual color values of the second set of color patches and the corresponding actual color values of the first set of color patches to the corresponding values of the neutral response;
        ii. If the actual color values of the second set of color patches are closer to the corresponding values of the neutral response than the corresponding actual color values of the first set of color patches, then changing the value of the second primary color of the color patch of the first set of color patches to the corresponding value of the adjusted second primary color of the color patch of the second set of color patches, otherwise keeping the value of the second primary color of the color patch of the first set of color patches;
        iii. Comparing the actual color values of the third set of color patches and the corresponding actual color values of the first set of color patches to the corresponding values of the neutral response;
        iv. If the actual color values of the third set of color patches are closer to the corresponding values of the neutral response than the corresponding actual color values of the first set of color patches, then changing the value of the third primary color of the color patch of the first set of color patches to the value of the adjusted third primary color of the corresponding color patch of the third set of color patches, otherwise keeping the value of the third primary color of the color patch of the first set of color patches;
    j. Repeating steps C through I until the first set of color patches is within a predetermined range of the neutral response.

2. The method of claim 1 wherein the first primary color is cyan, the second primary color is magenta, and the third primary color is yellow.

3. The method of claim 1 wherein the tonal scale spans from light to dark shades of a color defined by the first primary color, the second primary color and the third primary color.

4. The method of claim 1 further comprising the step of determining the tonal scale including a minimum scale value, a maximum scale value, and predetermined number of intermediate values.

5. The method of claim 1 further comprising the steps of:
    a. Determining an actual color of a paper;
    b. Printing a sample patch on the paper defined by the maximum values of the first primary color, the second primary color, and the third primary color;
    c. Determining an actual color of the sample patch; and
    d. Determining the neutral response based on the actual color of the paper and the actual color of the sample patch.

6. The method of claim 5 further comprising the step of defining the neutral response as points on a curve between the actual color of the paper and the actual color of the sample patch, the points corresponding to the tonal scale.

7. The method of claim 1 further comprising the steps of:
    a. Printing a set of sample patches where the color of each sample patch is defined by equal values of the first primary color, the second primary color, and the third primary color wherein the values are representative of the tonal scale;
    b. Determining the density each the sample patches in the set of sample patches; and
    c. Determining a tone reproduction curve based on density of the set of sample patches.

8. The method of claim 7 further comprising the steps of:
    a. Determining a curve corresponding to the first set of color patches;
    b. Comparing the curve for the first set of color patches with the tone reproduction curve; and c. Determining that the gray balance is achieved if the curve for the first set of color patches matches the tone reproduction curve.

9. The method of claim 1 wherein the tonal scale spans from light to dark tones, the method further comprising the step of determining the amount of adjustment for the values of the second primary color spanning the tonal scale in proportion to the darkness of the tone.

10. The method of claim 1 further comprising the step of measuring the printed color patches in the first, second and third sets using a spectrophotometer to determine the actual color of each color patch.

11. A method for determining color values required to produce a predetermined color on a particular printer, comprising the steps of:
   a. Determining values for a first primary color, a second primary color and a third primary color;
   b. Printing a first color patch according to the values for the first primary color, the second primary color and the third primary color;
   c. Adjusting the value of the second primary color;
   d. Printing a second color patch according to the values of the first primary color, and the third primary color used in the first color patch and the adjusted second primary color;
   e. Adjusting the value of the third primary color;
   f. Printing a third color patch according to the values of the first primary color and the second primary color used in the first color patch, and the adjusted third primary color;
   g. Determining actual color values for each of the printed color patches;
   h. Comparing the actual color values of the second color patch and the actual color values of the first color patch to the predetermined color;
   i. If the actual color values of the second color patch are closer to the predetermined color than the actual color values of the first color patches, then changing the value of the second primary color of the first color patch to the value of the adjusted second primary color;
   j. Comparing the actual color values of the third color patch and the actual color values of the first color patch to the predetermined color;
   k. If the actual color values of the third color patch are closer to the predetermined color than the actual color values of the first color patch, then changing the value of the third primary color the first color patch to the value of the adjusted third primary color;
   l. Repeating steps C through K until the first color patch is within a predetermined range of the predetermined color.

* * * * *